(12) United States Patent
Yang et al.

(10) Patent No.: US 10,120,066 B2
(45) Date of Patent: Nov. 6, 2018

(54) APPARATUS FOR MAKING A DISTANCE DETERMINATION

(71) Applicant: STMicroelectronics (Research & Development) Limited, Marlow, Buckinghamshire (GB)

(72) Inventors: Xiaoyong Yang, Cupertino, CA (US); Neale Dutton, Edinburgh (GB); Kevin Channon, Edinburgh (GB)

(73) Assignee: STMicroelectronics (Research & Development) Limited, Marlow (GB)

( * ) Notice: Subject to any disclaimer, the term of this patent is extended or adjusted under 35 U.S.C. 154(b) by 176 days.

(21) Appl. No.: 15/169,049

(22) Filed: May 31, 2016

(65) Prior Publication Data

US 2017/0184704 A1    Jun. 29, 2017

(30) Foreign Application Priority Data

Dec. 23, 2015   (EP) ..................... 15202558

(51) Int. Cl.
| | | |
|---|---|---|
| *G06K 9/00* | (2006.01) | |
| *G01S 7/481* | (2006.01) | |
| *G01S 17/10* | (2006.01) | |
| *G01S 17/89* | (2006.01) | |
| *G06T 7/00* | (2017.01) | |

(Continued)

(52) U.S. Cl.
CPC ............ *G01S 7/4816* (2013.01); *G01S 7/483* (2013.01); *G01S 17/023* (2013.01); *G01S 17/10* (2013.01); *G01S 17/46* (2013.01); *G01S 17/89* (2013.01); *G06T 7/0075* (2013.01); *H04N 5/2257* (2013.01); *H04N 5/23241* (2013.01);

(Continued)

(58) Field of Classification Search
CPC ........ G01S 17/023; G01S 17/10; G01S 17/46; G01S 17/89; G01S 7/4816; G01S 7/483; H04N 13/025; H04N 13/0253; H04N 13/0271; H04N 5/2257; H04N 5/23241; G06T 7/0075
See application file for complete search history.

(56) References Cited

U.S. PATENT DOCUMENTS 9,332,167 B1 *   5/2016   Pance ................... H04N 5/2258
2002/0060784 A1 * 5/2002  Pack ....................... G01S 7/481
                                                              356/6

(Continued)

FOREIGN PATENT DOCUMENTS

| EP | 2469295 A1 | 6/2012 |
|---|---|---|
| GB | 2465072 A | 5/2010 |

(Continued)

OTHER PUBLICATIONS

EPO Search Report and Written Opinion for EP15202558.1 dated Jun. 16, 2016 (9 pages).

*Primary Examiner* — Amara Abdi
(74) *Attorney, Agent, or Firm* — Crowe & Dunlevy

(57) ABSTRACT

An apparatus includes a camera module configured to generate at least one image and a ToF SPAD based range detecting module configured to generate at least one distance determination to an object within a field of view of the camera module. A processor receives the at least one image from the camera module output and receives the at least one distance determination from the ToF SPAD based range detecting module. This data is processed by the processor to determine a depth map.

20 Claims, 14 Drawing Sheets

(51) Int. Cl.
  *H04N 5/225* (2006.01)
  *H04N 5/232* (2006.01)
  *G01S 17/02* (2006.01)
  *G01S 17/46* (2006.01)
  *G01S 7/483* (2006.01)
  *H04N 13/02* (2006.01)

(52) U.S. Cl.
  CPC ....... *H04N 13/025* (2013.01); *H04N 13/0253* (2013.01); *H04N 13/0271* (2013.01)

(56) References Cited

U.S. PATENT DOCUMENTS

| | | | |
|---|---|---|---|
| 2006/0139314 A1* | 6/2006 | Bell | A63F 13/02 345/156 |
| 2013/0126716 A1* | 5/2013 | Lee | G01J 1/44 250/214 R |
| 2013/0182075 A1* | 7/2013 | Clifton | G01S 17/023 348/46 |
| 2013/0308013 A1 | 11/2013 | Li et al. | |
| 2014/0002726 A1* | 1/2014 | Rudmann | H01L 27/14618 348/374 |
| 2014/0362253 A1* | 12/2014 | Kim | H04N 5/262 348/231.4 |
| 2015/0109627 A1* | 4/2015 | Bestler | G01S 17/06 356/614 |
| 2015/0281678 A1 | 10/2015 | Park et al. | |
| 2015/0317037 A1* | 11/2015 | Suzuki | G06F 3/0425 345/175 |
| 2016/0047905 A1* | 2/2016 | Shiraki | G01S 7/4865 356/5.03 |
| 2016/0050404 A1* | 2/2016 | Bruls | H04N 13/0029 348/43 |
| 2016/0068267 A1* | 3/2016 | Liu | B64C 39/024 701/11 |
| 2017/0054962 A1* | 2/2017 | Zhou | G06T 7/0057 |
| 2017/0343675 A1* | 11/2017 | Oggier | G01S 17/48 |

FOREIGN PATENT DOCUMENTS

| | | | | |
|---|---|---|---|---|
| WO | WO-2009063472 A1 | | 5/2009 | |
| WO | WO 2016-106961 | * | 7/2016 | ............... B64G 1/24 |

* cited by examiner

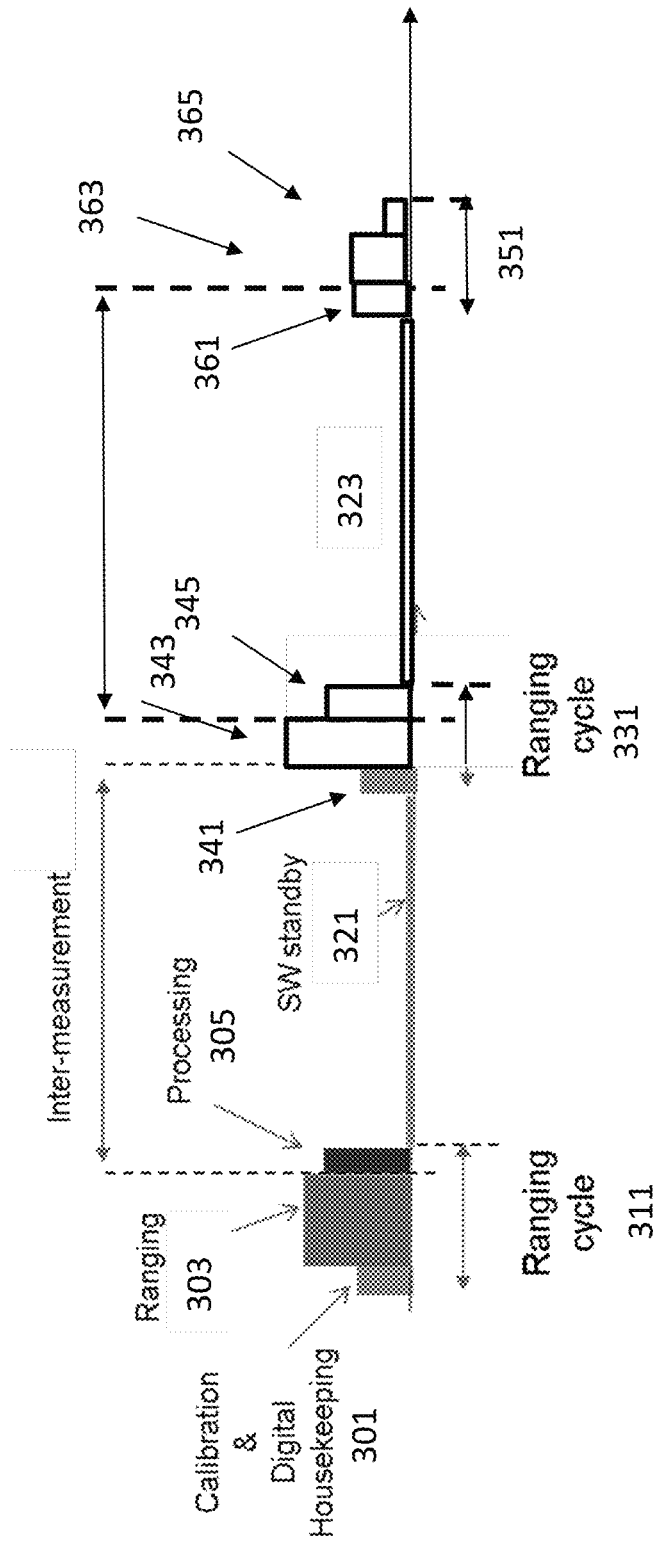

APPARATUS FOR MAKING A DISTANCE DETERMINATION

PRIORITY CLAIM

This application claims priority from European Application for Patent No. 15202558.1 filed Dec. 23, 2015, the disclosure of which is incorporated by reference.

TECHNICAL FIELD

Some embodiments relate to an apparatus and in particular but not exclusively to an apparatus with an array of photosensitive devices.

BACKGROUND

Devices for determining the distance to objects are known.

Current light (or laser) range and detect (LIDAR) devices and/or 3D map/depth devices are typically limited to a single application for which they are optimized. For example, in some devices multiple cameras or camera arrays provide images may be used to determine the range. Computational camera applications may compare features within these images and using the knowledge of intrinsic and extrinsic parameters associated with the cameras or camera arrays determine the distance from the device. Computational camera applications thus can create 3D images with associated 3D depth maps. The applications can, for example, employ such techniques as foreground-background separation, 3D scanning, and 3D modeling. These 3D depth maps or models may then be employed in Augmented Reality (AR), Virtual Reality (VR) and even logistic applications.

Accuracy, speed and consistency of the 3D/depth computation are important for the key use cases such as 3D scanning and modeling. For instance, the 3D scanning device should generate consistent 3D models, which can be used by the logistics company for storage space estimation. Errors in the 3D models can for example lead to incorrect space estimation.

However limitations in cameras, algorithms and device production prevent effective correction of all errors, motions and variations. Furthermore, these issues are typically worse in mobile devices because of the limited computation power, battery capacity and movement of the device during capture.

SUMMARY

According to a first aspect there is provided an apparatus comprising: at least one camera module configured to generate at least one image; at least one time of flight (ToF) single photon avalanche diode (SPAD) based range detecting module configured to generate at least one distance determination between the apparatus and an object within a module field of view; and a processor configured to receive at least one image from the at least one camera module output and at least one distance determination from the ToF SPAD based range detecting module output and based on the at least one camera module output and at least one distance determination to determine a depth map.

The processor may be configured to determine a mode of operation and the determination of the depth map based on the at least one camera module output and at least one distance determination may be further based on the mode of operation.

The mode of operation may be a light intensity mode, wherein the light intensity mode may be determined based on an ambient light level determined by the apparatus.

The determination of the depth map may further be based on the mode of operation and may further comprise the processor configured to: determine the depth map substantially based on the ToF SPAD based range detecting module at least one distance determination when the light intensity mode is low ambient light; determine the depth map substantially based on the at least one image from the at least one camera module when the light intensity mode is high ambient light; and determine the depth map based on a combination of the ToF SPAD based range detecting module at least one distance determination and the at least one image from the at least one camera module when the light intensity mode is neither low nor high ambient light.

The mode of operation may be a speed mode, wherein the speed mode may be determined based on a speed of an object within the depth map.

The determination of the depth map further based on the mode of operation and may further comprise the processor configured to: determine the depth map substantially based on the ToF SPAD based range detecting module at least one distance determination when the speed mode is fast; determine the depth map substantially based on the at least one image from the at least one camera module when the speed mode is slow; and determine the depth map based on a combination of the ToF SPAD based range detecting module at least one distance determination and the at least one image from the at least one camera module when the speed mode is neither fast nor slow or is both fast and slow.

The mode of operation may be an accuracy mode, wherein the accuracy mode may be determined based on a desired accuracy of an object within the depth map.

The determination of the depth map may further be based on the mode of operation and may further comprise the processor configured to: determine the depth map substantially based on the ToF SPAD based range detecting module at least one distance determination when the accuracy mode is a high accuracy mode; determine the depth map substantially based on the at least one image from the at least one camera module when the accuracy mode is low accuracy mode; and determine the depth map based on a combination of the ToF SPAD based range detecting module at least one distance determination and the at least one image from the at least one camera module when the accuracy mode is neither low nor high accuracy.

The mode of operation may be a range mode, wherein the range mode may be determined based on an expected distance of an object within the depth map from the apparatus.

The determination of the depth map may further be based on the mode of operation and may further comprise the processor configured to: determine the depth map substantially based on the ToF SPAD based range detecting module at least one distance determination when the range mode is a macro or near distance; determine the depth map substantially based on the at least one image from the at least one camera module when the range mode is a far distance; and determine the depth map based on a combination of the ToF SPAD based range detecting module at least one distance determination and the at least one image from the at least one camera module when the light intensity mode is neither near or far or near and far distances.

The mode of operation may be a power mode, wherein the power mode may be determined based on a desired power usage of the apparatus.

The determination of the depth map may further be based on the mode of operation and may further comprise the processor configured to: determine the depth map substantially based on the ToF SPAD based range detecting module at least one distance determination when the range mode is a low power mode; determine the depth map substantially based on the at least one image from the at least one camera module when the range mode is a high power mode; and determine the depth map based on a combination of the ToF SPAD based range detecting module at least one distance determination and the at least one image from the at least one camera module when the light intensity mode is neither low or high power modes.

The at least one camera module may comprise two camera modules separated by a determined distance, wherein one of the at least one ToF SPAD based range detecting modules may be configured to be located within the volume defined by the determined distance.

The at least one camera module may comprise a multi-aperture camera.

The processor may be configured to: determine a first depth map based on the at least one image from the at least one camera module output; determine at least one point on the depth map which is spatially co-incident with the at least one distance determination from the ToF SPAD based range detecting module; and calibrate the first depth map at the at least one point based on the spatially co-incident distance determination.

According to a second aspect there is provided a method comprising: providing at least one camera module configured to generate at least one image; providing at least one ToF SPAD based range detecting module configured to generate at least one distance determination between the apparatus and an object within a module field of view; receiving at least one image from the at least one camera module output and at least one distance determination from the ToF SPAD based range detecting module output; and determining based on the at least one camera module output and at least one distance determination a depth map.

The method may further comprise determining a mode of operation, wherein determining the depth map based on the at least one camera module output and at least one distance determination may further comprise determining the depth map from the at least one camera module output and at least one distance determination based on the mode of operation.

Determining a mode of operation may comprise determining a light intensity mode.

Determining a light intensity mode may comprise determining an ambient light level.

Determining the depth map based on the mode of operation may further comprise: determining the depth map substantially based on the ToF SPAD based range detecting module at least one distance determination when the light intensity mode is low ambient light; determining the depth map substantially based on the at least one image from the at least one camera module when the light intensity mode is high ambient light; and determining the depth map based on a combination of the ToF SPAD based range detecting module at least one distance determination and the at least one image from the at least one camera module when the light intensity mode is neither low nor high ambient light.

Determining a mode of operation may comprise determining a speed mode.

Determining a speed mode may comprise determining a speed of an object within the depth map.

Determining the depth map may further be based on the mode of operation and may further comprise: determining the depth map substantially based on the ToF SPAD based range detecting module at least one distance determination when the speed mode is fast; determining the depth map substantially based on the at least one image from the at least one camera module when the speed mode is slow; and determining the depth map based on a combination of the ToF SPAD based range detecting module at least one distance determination and the at least one image from the at least one camera module when the speed mode is neither fast nor slow or is both fast and slow.

Determining a mode of operation may comprise determining an accuracy mode.

Determining an accuracy mode may comprise determining a desired accuracy of an object within the depth map.

Determining the depth map further based on the mode of operation may further comprise: determining the depth map substantially based on the ToF SPAD based range detecting module at least one distance determination when the accuracy mode is a high accuracy mode; determining the depth map substantially based on the at least one image from the at least one camera module when the accuracy mode is low accuracy mode; and determining the depth map based on a combination of the ToF SPAD based range detecting module at least one distance determination and the at least one image from the at least one camera module when the accuracy mode is neither low nor high accuracy.

Determining a mode of operation may comprise determining a range mode.

Determining the range mode may comprise determining an expected distance of an object within the depth map from the apparatus.

Determining the depth map may further be based on the mode of operation and may further comprise: determining the depth map substantially based on the ToF SPAD based range detecting module at least one distance determination when the range mode is a macro or near distance; determining the depth map substantially based on the at least one image from the at least one camera module when the range mode is a far distance; and determining the depth map based on a combination of the ToF SPAD based range detecting module at least one distance determination and the at least one image from the at least one camera module when the light intensity mode is neither near or far or near and far distances.

Determining a mode of operation may comprise determining a power mode.

Determining a power mode may comprise determining a desired power usage of the apparatus.

Determining of the depth map may further be based on the mode of operation and may further comprise: determining the depth map substantially based on the ToF SPAD based range detecting module at least one distance determination when the range mode is a low power mode; determining the depth map substantially based on the at least one image from the at least one camera module when the range mode is a high power mode; and determining the depth map based on a combination of the ToF SPAD based range detecting module at least one distance determination and the at least one image from the at least one camera module when the light intensity mode is neither low or high power modes.

Providing the at least one camera module may comprise locating two camera modules separated by a determined distance, wherein providing the at least one ToF SPAD based range detecting module comprises locating one of the at least one ToF SPAD based range detecting modules within the volume defined by the determined distance.

Providing the at least one camera module may comprise providing a multi-aperture camera.

The method may further comprise: determining a first depth map based on the at least one image from the at least one camera module output; determining at least one point on the depth map which is spatially co-incident with the at least one distance determination from the ToF SPAD based range detecting module; and calibrating the first depth map at the at least one point based on the spatially co-incident distance determination.

According to a third aspect there is provided an apparatus comprising: means for generating at least one image; means for generating at least one distance determination from a ToF SPAD based range detecting module; means for determining based on the at least one camera module output and at least one distance determination a depth map.

The apparatus may further comprise means for determining a mode of operation, wherein the means for determining the depth map based on the at least one camera module output and at least one distance determination may further comprise means for determining the depth map from the at least one camera module output and at least one distance determination based on the mode of operation.

The means for determining a mode of operation may comprise means for determining a light intensity mode.

The means for determining a light intensity mode may comprise means for determining an ambient light level.

The means for determining the depth map based on the mode of operation may further comprise: means for determining the depth map substantially based on the ToF SPAD based range detecting module at least one distance determination when the light intensity mode is low ambient light; means for determining the depth map substantially based on the at least one image from the at least one camera module when the light intensity mode is high ambient light; and means for determining the depth map based on a combination of the ToF SPAD based range detecting module at least one distance determination and the at least one image from the at least one camera module when the light intensity mode is neither low nor high ambient light.

The means for determining a mode of operation may comprise means for determining a speed mode.

The means for determining a speed mode may comprise means for determining a speed of an object within the depth map.

The means for determining the depth map may further be based on the mode of operation and may further comprise: means for determining the depth map substantially based on the ToF SPAD based range detecting module at least one distance determination when the speed mode is fast; means for determining the depth map substantially based on the at least one image from the at least one camera module when the speed mode is slow; and means for determining the depth map based on a combination of the ToF SPAD based range detecting module at least one distance determination and the at least one image from the at least one camera module when the speed mode is neither fast nor slow or is both fast and slow.

The means for determining a mode of operation may comprise means for determining an accuracy mode.

The means for determining an accuracy mode may comprise means for determining a desired accuracy of an object within the depth map.

The means for determining the depth map may further be based on the mode of operation and may further comprise: means for determining the depth map substantially based on the ToF SPAD based range detecting module at least one distance determination when the accuracy mode is a high accuracy mode; means for determining the depth map substantially based on the at least one image from the at least one camera module when the accuracy mode is low accuracy mode; and means for determining the depth map based on a combination of the ToF SPAD based range detecting module at least one distance determination and the at least one image from the at least one camera module when the accuracy mode is neither low nor high accuracy.

The means for determining a mode of operation may comprise means for determining a range mode.

The means for determining the range mode may comprise means for determining an expected distance of an object within the depth map from the apparatus.

The means for determining the depth map may further be based on the mode of operation and may further comprise: means for determining the depth map substantially based on the ToF SPAD based range detecting module at least one distance determination when the range mode is a macro or near distance; means for determining the depth map substantially based on the at least one image from the at least one camera module when the range mode is a far distance; and means for determining the depth map based on a combination of the ToF SPAD based range detecting module at least one distance determination and the at least one image from the at least one camera module when the light intensity mode is neither near or far or near and far distances.

The means for determining a mode of operation may comprise means for determining a power mode.

The means for determining a power mode may comprise means for determining a desired power usage of the apparatus.

The means for determining of the depth map may further be based on the mode of operation and may further comprise: means for determining the depth map substantially based on the ToF SPAD based range detecting module at least one distance determination when the range mode is a low power mode; means for determining the depth map substantially based on the at least one image from the at least one camera module when the range mode is a high power mode; and means for determining the depth map based on a combination of the ToF SPAD based range detecting module at least one distance determination and the at least one image from the at least one camera module when the light intensity mode is neither low or high power modes.

The apparatus may further comprise: means for determining a first depth map based on the at least one image from the at least one camera module output; means for determining at least one point on the depth map which is spatially co-incident with the at least one distance determination from the ToF SPAD based range detecting module; and means for calibrating the first depth map at the at least one point based on the spatially co-incident distance determination.

BRIEF DESCRIPTION OF DRAWINGS

Some embodiments will now be described by way of example only and with reference to the accompanying Figures in which:

FIG. 3 shows an example ranging timing diagram implemented by the example apparatus shown in FIG. 1;

DETAILED DESCRIPTION OF SOME EMBODIMENTS

Figure 1:
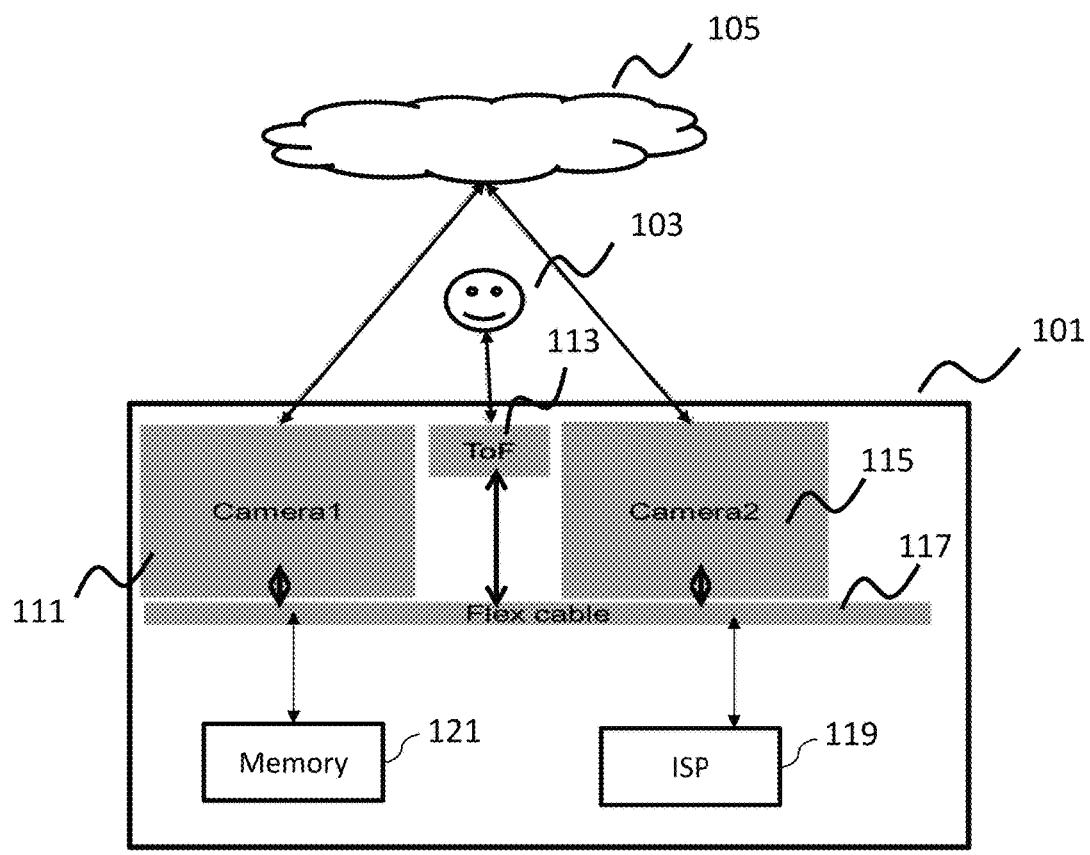
FIG. 1 shows a schematic view of an example apparatus comprising a distance determination module.

The concept associated with embodiments as described herein is the employment and association of range finding modules and applications to assist the implementation of 3D ranging and 3D modeling applications.

A conventional multiple camera or camera array implementation in a mobile phone may, for example, determine an object's motion away from the mobile phone and thus enable gesture control of the mobile phone. First, the multiple cameras may capture images. The Image Signal Processor (ISP) then post-processes the images to construct a 3D map. The multi-camera (and especially dual-camera) implementation can provide 3D scan and foreground-background separation. A multi-camera implementation typically does not increase the mobile phone's Z height (or the thickness), which is common problem for higher resolution mobile cameras in the "pixel race". Unfortunately computational camera implementations have the following problems:

Noise: The image quality (IQ) of the camera is typically poor in low light condition due to high ambient noise, low signal rate and image sensor sensitivity limitations.

Speed: The camera implementation typically is slower in capturing the images in low light due to the longer focus time and the longer exposure time. Any subject movement and device motion (e.g. handshake) can cause blurriness in the captured image and therefore cause errors in any generated 3D model.

Accuracy: As the 3D/depth map is created by image processing, the accuracy of the 3D/depth map is limited by the image quality and the ISP algorithm. For instance, if the camera is not focused properly because of the subject moving or handshake moving the device, the image will be blurry and then the computed result can be inaccurate. In addition, manufacturing and production consistency can limit the accuracy.

Power: A multi-camera and multi-chip implementation consumes a significant amount of power with respect to battery powered devices. Multiple frame capturing and computation is also a heavy power consumer.

Size: Camera module size is significant with respect to a handheld or mobile device. Multiple cameras thus may take up even more space in a mobile device.

Production: A multi-camera device may be challenging to produce due to the part-part variation and the potential misalignment between multi-cameras, while the depth computation is calculated partially based on the distance between multiple cameras. Therefore the variation and misalignment of the multi-camera implementation can lead to inaccurate 3D/depth map generation.

The above limitations such as camera IQ, capture speed and accuracy can thus limit the use of multi-camera 3D/depth implementations and the user experience thereof. In addition, the size and the power consumption issues can further limit their implementation in mobile devices.

The concept as discussed in further detail herein may be embodied in the example where a conventional multi-camera implementation is combined with a time of flight (ToF) module. A ToF module may comprise packaging which supports a laser, a sensor and an aperture (which may be a suitable optical window or lens). A pulse of light is emitted from the laser, passes through the aperture and may be reflected off an object (through a return aperture) and back to the sensor. The time taken for the light to travel to the object and be reflected back onto the sensor may be used to determine the distance between the object and the device based on the known speed of light. This is known as direct measurement of the distance. Alternately, an indirect measurement of the time taken may be obtained by measuring the phase shift between the signal coming out of the light source and the signal reflected on the object and detected by a light sensor.

A ToF module sensor may comprise single photon avalanche diodes (SPADs) used as an indicator of reflected light. In general an array of SPADs are provided as a sensor in order to detect a reflected light pulse. A photon generated carrier (such as a photon in the light pulse) may trigger an avalanche current in one or more of the SPADs in an SPAD array. The avalanche current may signal an event, namely that a photon of light has been detected.

In such a manner the time of flight module may improve the accuracy, speed and reduce the variation produced by the computational camera application.

Although conventional Infra-Red (IR) light and IR proximity sensor may be used to overcome some of the issues raised these are limited in accuracy and ranging distance. For example, the table below demonstrates the problems with using conventional IR and IR reflectivity assistance compared against the time of flight (ToF) module.

|  | IR Module | ToF module |
| --- | --- | --- |
| Real distance o/p | No (computed) | Real distance in mm |
| Maximum distance | 20 cm | >40 cm |
| Works for range of object colors and reflectance | No | Yes including low reflectance black (3%) surfaces |

Furthermore the IR module comprising an IR light and IR sensor can occupy a large space and hence this will increase the cost, the size and the power.

In the embodiments as described in further detail hereafter the ToF module assisted 3D/depth solution may have advantages in low light, speed, accuracy, range, power, size, and more. For example the ToF module, which may use a single-photon avalanche diode (SPAD) and count the returned photons instead of return signal power, can improve the low light performance, the measurement speed and the ranging accuracy. Similarly, in some embodiments, the ToF module, which uses the SPAD may measure speed of light, may reduce the overall system power consumption. The ToF module may furthermore use a vertical cavity surface emitting laser (VCSEL) plus a SPAD incorporated within a single module and may be used to reduce the physical size for a multiple camera 3D/depth implementation. For example, as described herein the ToF module may replace one or more of the multiple cameras. Furthermore the packaging size of a ToF module may enable reuse of space between multiple cameras.

A first example device or apparatus comprising a ToF distance determination module is shown in FIG. 1.

FIG. 1, for example, shows an apparatus or device 101 comprising a first camera 111 coupled to a flex cable 117. Furthermore, the apparatus 101 comprises a second camera 115 also coupled to the flex cable 117. The first and second cameras 111, 115 are arranged such that they are configured to capture at least a partially overlapping field of view but are separated by a 'void' space enabling the field of view of each camera is sufficiently different to enable 3D/depth analysis to be performed.

The example apparatus 101 further comprises a flex cable 117. The flex cable 117 is an example of an electrical coupling suitable for providing power and timing signals to the modules such as the cameras and furthermore to enable the outputting of image and sensing data to a processor such as an image signal processor (ISP) 119 and memory 121. Thus, in some embodiments the flex cable 117 may be replaced by any suitable electrical coupling such as printed circuit board tracks, where the printed circuit further supports or locates the cameras and other modules.

The example apparatus or device 101 may comprise a processor or image signal processor 119 configured to execute or run programs or applications for processing the image or sensor data. For example, the ISP 119 may be configured to process the image and/or sensor data to generate a suitable 3D/depth map or model.

The example apparatus or device 101 may furthermore comprise a memory 121 coupled to the flex cable 117. The memory 121 may be configured to store both sensor and image signal data and furthermore the applications executed by the ISP 119.

Figure 12:
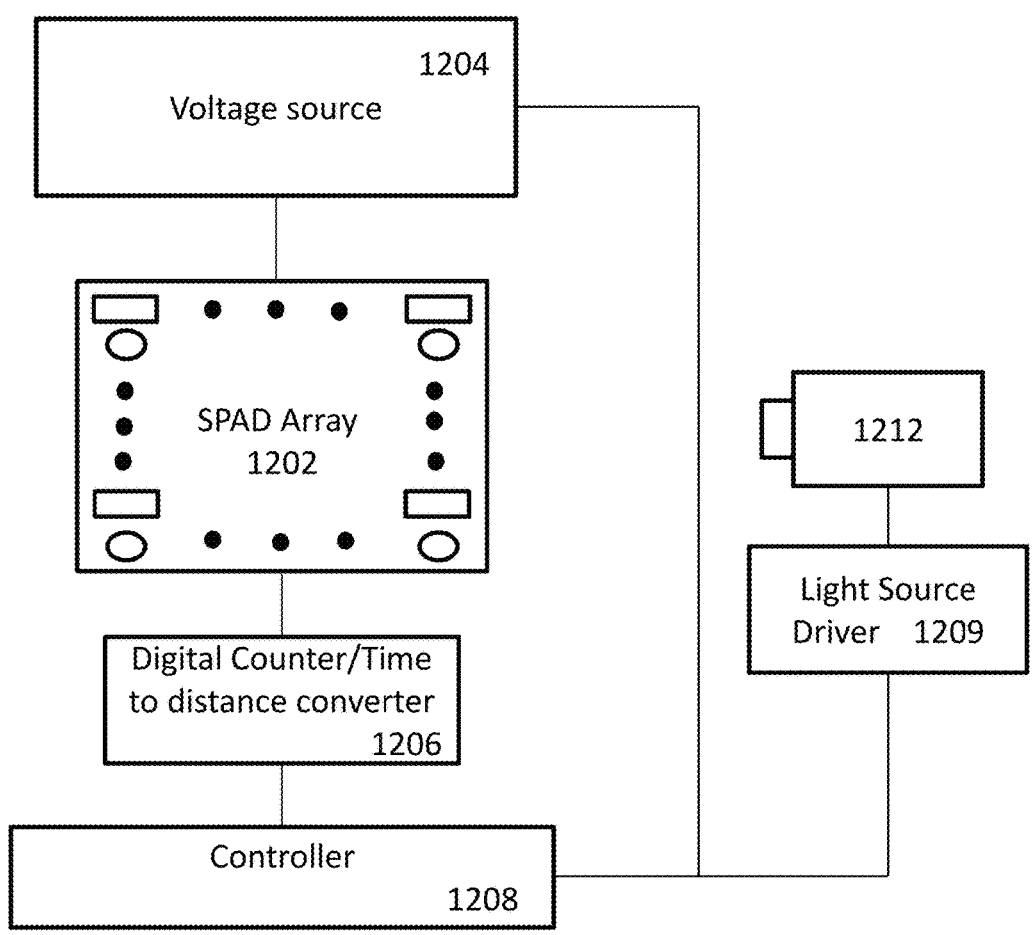
FIG. 12 shows a schematic view of an example time of flight module.

The apparatus 101 may furthermore comprise a ToF module 113 also coupled to the flex cable 117. The ToF module 113 in the example apparatus 101 is located in the 'void' space between the first camera 111 and the second camera 115. A schematic example of a ToF module is shown in further detail with respect to FIG. 12. The ToF module comprises a voltage source 1204. This voltage source may be an on chip voltage source or may be voltage source may be an external to the chip and again may take any suitable format.

The voltage source 1204 is configured to control the voltage applied to the SPAD array 1202. The voltage source 1204 provides the voltage which is used in each SPAD of the SPAD array 1202. The output of each SPAD may be provided to a digital counter/time-to-distance converter (TDC) 1206. In one embodiment, the digital counter/TDC 1206 is configured to count each time the output of a SPAD indicating the arrival of a single photon. The digital counter/TDC 1206 is further configured use these counts to and apply a time to distance conversion to output a suitable detected object distance value. The time to distance conversion can be any suitable process, such as a 'stopwatch' function or an intensity based tuning function. The output of the digital counter/TDC 1206 may be input to a controller 1208. The controller may take any suitable form and may be implemented by hardware, software and/or a combination of the two. In some embodiments, the controller may comprise a firmware controller. In other embodiments, the controller comprises at least one processor. The output of the controller 1208 may be used to provide an input to the voltage source 1204. The input provided by the controller 1208 controls the voltage which is provided by the voltage source 1204.

The ToF module 113 may also comprise a light source 1212, the light source 1212 may be driven by a light source driver 1209 and controlled by the controller 1208. The light source may be a vertical cavity surface emitting laser (VCSEL). The ToF module may be configured to determine the distance between an object and the module according to any suitable manner.

The example shown in FIG. 1 furthermore shows a 'near' or foreground object 103 and a 'far' or background object 105 which may be sensed by the apparatus.

The ISP 119 configured to receive the sensor output of the ToF module 113 and the images from the first camera 111 and the second camera 115 to perform more optimized ranging determinations. In the following examples these are exemplified by the operation of generating a 3D/depth map or model. Furthermore in some embodiments the ISP 119 may be configured to control the cameras and the ToF module in order to more optimize power consumption or speed of generation accuracy of the generated 3D/depth map or model. This control may in some embodiments be based on sensor or camera input to the ISP 119.

Figure 13:
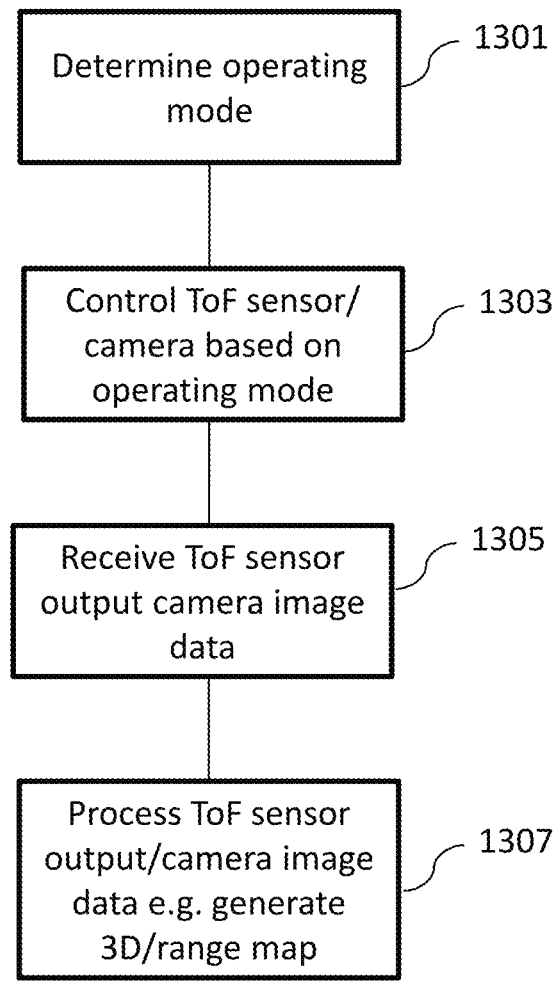
FIG. 13 shows a flow diagram of the operation of the example apparatus.

With respect to FIG. 13 an example series of operations performed by the apparatus as shown in FIG. 1 is described.

The ISP 119 may in some embodiments be configured to determine an operating mode or use case. The operating mode or use case may be determined based on a sensor or user input. For example, an operating mode may be a light based operating mode (low, mid, high light level), a speed based operating mode (fast, medium, slow), a range based operating mode, or subject based operating mode. The operating mode may define the type of processing to be applied to the received data and thus define how to control the sensor or cameras generate sensor or image data.

The operation of determining an operating mode is shown in FIG. 13 by step 1301.

The ISP may then be configured to control the ToF module and/or camera modules based on the determined operating mode.

The operation of controlling the modules based on the determined operating mode is shown in FIG. 13 by step 1303.

The ISP may then be configured to receive the ToF module output and/or the cameras image data.

The operation of receiving the ToF module output and/or the cameras image data is shown in FIG. 13 by step 1305.

The ISP may then be configured to process the received ToF sensor data and/or the camera's image data. For example the ISP may be configured to generate a 3D/depth map or model surrounding the apparatus. In some embodiments the ISP is configured to use the ToF sensor data to generate a 'near' object model and the cameras image data to generate a 'far' object model and combine the two to generate a 3D/depth map which has a greater range or lower power consumption than could be achieved by one or other of the sensor types.

For example, while a camera typically performs better in strong light condition, the ToF module performs better in low light conditions. The ToF module counts the photons returned in order to measure the distance. As ambient noise is lower in dark or poor light conditions, the measurement accuracy and ranging distance of a ToF module is higher in dark/low light. Thus, for example, in some embodiments where the ISP 119 is configured to receive both the multiple-camera images and the ToF module sensor outputs, then the ISP 119 may determine a light level and from this light level select whether to use the ToF module output or the camera images to generate the 3D mapping. For example, in a strong light (which may be >3K lux halogen) use case or mode the camera image data is used, and for a low light (which may be <1K lux halogen) use case or mode the ToF module output is used, and for a mid light mode (which may be between 1K to 3K lux halogen) then a hybrid of the two types may be used. This is summarized in the following table.

| Use case/Mode | primary technology for 3D/depth | |
|---|---|---|
| Low light (e.g. <1K lux halogen) | ToF | |
| Mid light (e.g. 1-3K lux halogen) | Hybrid | |
| Strong light (e.g. >3K lux halogen) | | Dual-camera |

Furthermore, in some embodiments where the camera is able to capture images within the infra-red spectrum (in other words an IR camera is used in the multiple-camera configuration, or if an IR pass filter and RGB camera is used in the multiple-camera configuration), then the ToF module can also be used as an IR illuminator to brighten the scene.

In some embodiments the ISP 119 may furthermore determine whether the 3D/depth map or model is required within a defined period and determine whether to use the camera image data, the ToF sensor data or a combination or hybrid of the two. The time required by the multiple camera method to generate a 3D/depth application output requires the cameras to capture images and then the ISP to compute the depth map. The image capture and the ISP computation operations take a significant amount of time. For instance, the camera typically requires ~500 ms to focus. However, the ToF module requires typically about 33 ms to measure an accurate range.

In some embodiments the ISP 119 may determine whether a fast (such as <120 ms), medium (such as 120 ms to 1 s) or slow (such as >1 s) estimation mode or use case is to be implemented and select the image or sensor data inputs based on the determination. Thus, the ISP may be configured to initialize the ToF module for fast capture modes or use cases, for example, when determining the range to a "moving" subject. The ISP may furthermore initialize and process multiple-camera images in a slow capture mode or use case, such as where the 3D/Depth map is of a "still" subject.

The ISP may furthermore operate both the ToF module and the multi-cameras in parallel, and can use the ToF module output to estimate a range on a moving subject (such as a moving hand) in a short time, while the multiple-camera images can be configured to build 3D map of the slower objects such as the rest of the body and the background in parallel. This is summarized in the following table.

| Use case/Mode | primary technology for 3D/depth | |
|---|---|---|
| Fast (e.g. <120 ms) | ToF | |
| Medium (e.g. 120 ms-1 sec) | Hybrid | |
| Slow (e.g. >1 sec) | | Dual-camera |

As discussed herein a conventional 3D/depth application employing a pure multiple camera implementation may have accuracy limitations which are difficult or unable to overcome. For instance, a camera image quality (IQ) may be limited by the hardware such as the auto-focus (AF) implementation, the lens and the image sensor. Furthermore, the multiple cameras can be misaligned in production or manufacture of the apparatus. As the ToF sensor comprises a laser and SPAD where the range measurement result is based on the average photon time of arrival rather than the amplitude, or photon count, of the return power the ranging accuracy is independent of the target reflectance and as such can result in a mean error of ranging measurement lower than a few percent.

Thus, the ISP in some embodiments may determine accuracy modes or use cases (in other words where accuracy is required) and select the multiple camera and the ToF module outputs based on the required accuracy mode or use case. For example, where the ISP is configured to generate a 3D map of a person sitting on a sofa, the ToF module ranging estimates may be used to give accurate 3D/depth info about the person (the main subject) and in parallel move the "Window of Interest" to build a less accurate 3D map of the background (the secondary subject). The two depth models can then be merged to generate a complete 3D/depth model. The following table shows a summary of the example accuracy use cases.

| Use case/Mode | primary technology for 3D/depth | |
|---|---|---|
| High accuracy (e.g. <5% +-error) | ToF | |
| Medium accuracy (e.g. 5-10% +-error) | Hybrid | |
| Low accuracy (e.g. >10% error) | | Dual-camera |

The ToF module may furthermore enable the measurement of an accurate range at near distance and macro distances whereas the multiple camera implementation produces better results for far distance and near "infinity" distances from the apparatus. In some embodiments the ISP may be configured to determine distance based modes or use cases and select to use the ToF module or camera data based on the determined mode. For example, by combining the ToF module and the camera modules the ISP may be configured to generate 3D/depth map which is accurate over a wide range of distances by calibrating the camera modules. Thus, in some embodiments the ToF module may be configured to produce ranging information which can be used to assist and offset any production or manufacturing errors within the multiple camera modules. The multi-camera modules may for example have part-to-part variations, thermal variations and potential misalignments which could lead to inaccurate computation of 3D/depth map. Similarly, in some embodiments the ISP may use the ToF module ranging information to provide a reference for the multi-camera modules. For instance, the ToF module range may determine an object such as a wall at a first distance e.g. 200 mm, while the multi-camera determined range is a second distance e.g. 220 mm. This difference may, for example, be due to production variation or thermal variation within the camera modules. As the ToF module ranging is known to be more accurate, the ISP may use ToF ranging as a calibration or reference value and offset the multi-camera ranging determination values by the difference between the first and second distances e.g. by −20 mm. Providing the error between the determined first and second distances is constant for a range of distances the multi-camera modules can then be used to determine the range for objects beyond the ToF maximum effective range distance (e.g. >1300 mm) but benefit from the calibration or reference provided by the ToF module.

Thus, by calibrating the camera modules by use of the ToF module a 3D/depth model or map can be generated which is able to provide a 3D map for near and far ranges of distances concurrently, for example, where the apparatus is attempting to map or model near objects such as a butterfly resting on a flower and also far objects such as the garden background. The butterfly and flower may be approximately 10 cm distant from the device whereas the garden is about 10 m distant. The ToF module may be configured to measure depth info about the butterfly/flower which is at a 'macro' distance. In parallel, the multiple-camera can move a "Window of Interest" (WoI) to build a 3D map of the garden. The processor or ISP may then combine or merge the two depth models to generate a 3D map which has a significantly greater range than would be possible with either sensor type.

Figure 2:
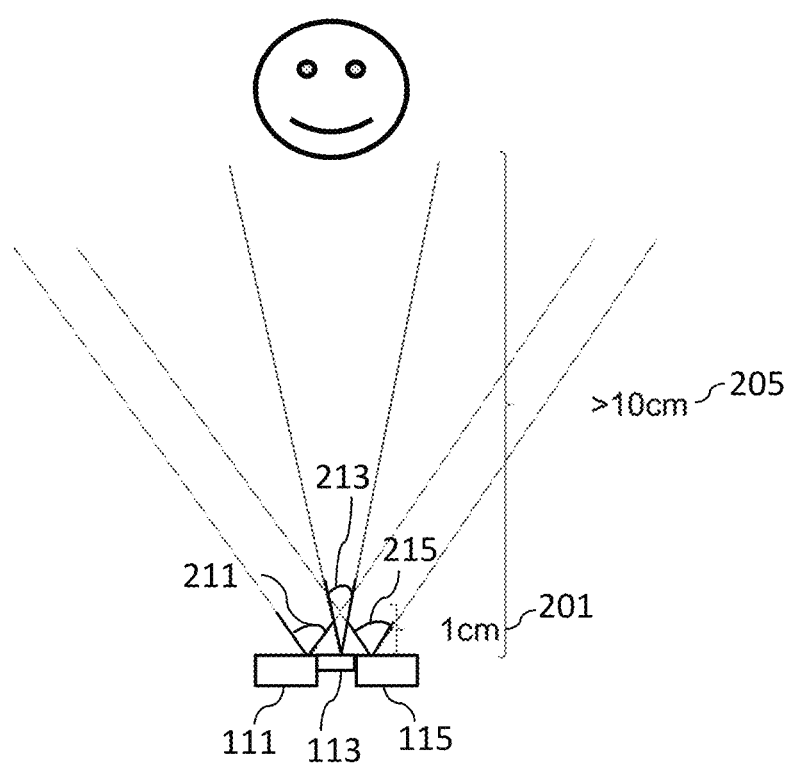
FIG. 2 shows example beam coverage using the example apparatus shown in FIG. 1.

Thus, for example with respect to FIG. 2 the field of view width 211 of the first camera 111, the field of view 213 of the ToF module 113 and the field of view 215 of the second camera 115 are shown with the macro 201 and near, mid and far distances 205 shown. This distance based use case/mode selection for example is summarized in the table below.

| Use case/Mode | primary technology for 3D/depth | | |
|---|---|---|---|
| Macro (e.g. <10 cm) | ToF | | |
| Near (e.g. 10 cm-100 cm) | ToF | | |
| Mid(e.g. 100 cm-200 cm) | | Hybrid | |
| Far (e.g. >200 cm) | | | Dual-camera |

In some embodiments, the ISP may be configured to determine power based use cases or modes of operation. In such embodiments, the ToF module may be configured to measure a range in order to reduce power consumption in some modes/use cases such as when the apparatus is operating in low light and power efficient (or low power) modes. This is because in low light levels, the camera tends to have poor IQ. In an attempt to overcome the poor IQ more time (and thus more energy) is provided for the camera to focus, furthermore the camera gain is increased and the exposure time is extended.

For example, FIG. 3 shows power consumption for a first, second and third ranging cycle for a multiple camera implementation. The first ranging cycle 311 shows a 'high' power implementation where the power consumption against time graph of an apparatus using only the cameras in low light situation to perform a ranging or mapping operation. The second ranging cycle 331 shows a 'balanced' power implementation where the power consumption against time graph of an apparatus using the ToF module to assist the cameras in low light situation to perform a ranging operation. The third ranging cycle 351 shows an example 'low' power implementation where the power consumption against time graph of an apparatus using the ToF module only to perform the ranging operation. The first ranging cycle 311 comprises a calibration and digital housekeeping (CDH) part 301, followed by the ranging part 303 and followed by a processing part 305, where the power consumption during the ranging part is a significant proportion of the overall power consumption defined by the total area under the CDH 301, ranging 303 and processing 305 parts. The first ranging cycle is then followed by a standby period 321 before a second ranging cycle 331 with ToF assist CDH 341, ToF assist ranging 343 and processing 345 parts follows. By using the ToF module the instantaneous power consumption is raised slightly but enables the ranging operation to be significantly shorter and thus decreases the power consumption significantly over a cycle. The second ranging cycle is then followed by a further standby period 323 before a third ranging cycle 351 with ToF only CDH 361, ToF only ranging 363 and ToF only processing 365 parts follows. By using the ToF module only the instantaneous power consumption is decreased in the ranging and processing parts and the ranging operation may be significantly shorter and thus further decreases the power consumption significantly over a cycle.

Thus, in some embodiments the ISP may be configured to use the output of the ToF sensor to directly read out the range and reduce the camera focus time (and therefore reduce the overall power consumption). As the ToF sensor is designed to be laser safe (typically class 1), the max power of the laser is limited and thus the range of distances able to be reliably determined is limited when using the ToF module only. Thus, in some embodiments the ISP may be configured to determine that in a high/max power ranging mode or use case involving far distance and wide Field of View (FoV) ranging the images from the multi-cameras are to be used. Furthermore the ISP may be configured to enable a combined ToF sensor and multi-camera 3D/depth implementation to achieve a "balanced" power consumption in different power modes.

| Use case/Mode | primary technology for 3D/depth | | |
|---|---|---|---|
| Low power (e.g. <50 mW) | ToF | | |
| Medium power (e.g. 50-100 mW) | | Hybrid | |
| High power (e.g. >100 mW) | | | Dual-camera |

Figure 4A:
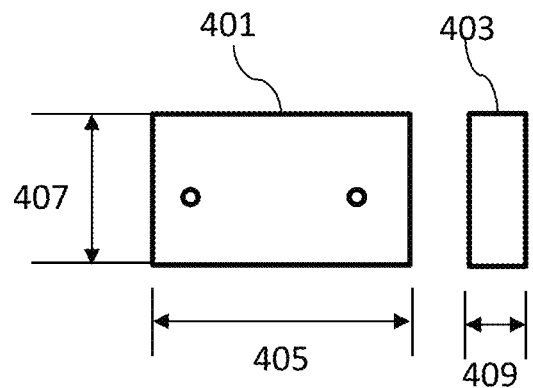
FIGS. 4A-4B show schematic views of time of flight (SPAD) and camera modules as implemented within the apparatus as shown in FIG. 1.
Figure 4B:
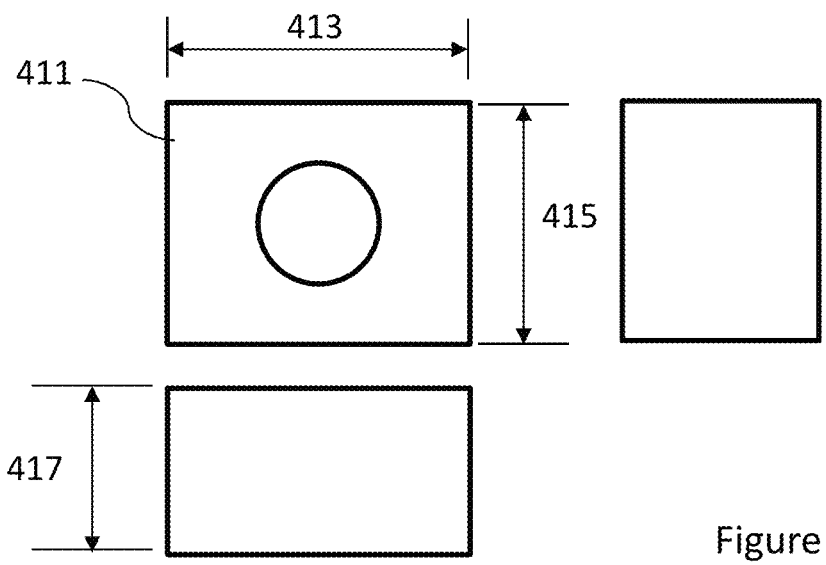

FIGS. 4A and 4B show (not to scale) the plan and elevation for a ToF module 401 and a camera module 411. The ToF modules are much smaller and as shown in FIG. 1 can re-use the spaces around the camera module and share the flexible connection with multi-camera. The ToF module is typically much smaller than the camera module. For instance a ToF module 401 may have volume defined by a length 405, width 407 and depth 409 which is approximately 25 times smaller than the volume of a simple camera 411 module defined by the dimensions length 413, width 415 and depth 417.

As such, a ToF module may be placed in the void or space between camera modules without impacting on the package sizing. For example, a plan view of a suitable implementation of the apparatus shown in FIG. 1 is shown in FIG. 6A, where the twin camera configuration of the first camera 611 and second camera 615 are separated by the ToF module 613 and all mounted on the flexible connector 617.

In some situations one or more camera modules may be replaced by a camera array array/hybrid camera and camera array.

Figure 5:
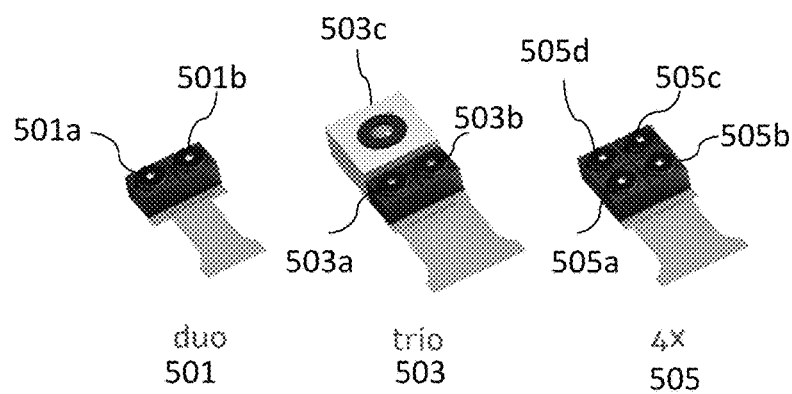
FIG. 5 shows example camera and camera array configurations.

Examples of camera arrays and hybrid camera and camera arrays are shown in FIG. 5 wherein a duo array comprising a first array camera 501 and second array camera 501b is shown. FIG. 5 furthermore shows a trio array 503 comprising a first array camera 503a, a second array camera 503b and a camera module 503c. Furthermore, FIG. 5 shows a multi-aperture array 505 comprising a first array camera 505a, a second array camera 505b, a third array camera 505c, and a fourth array camera 505b.

Figure 6A:
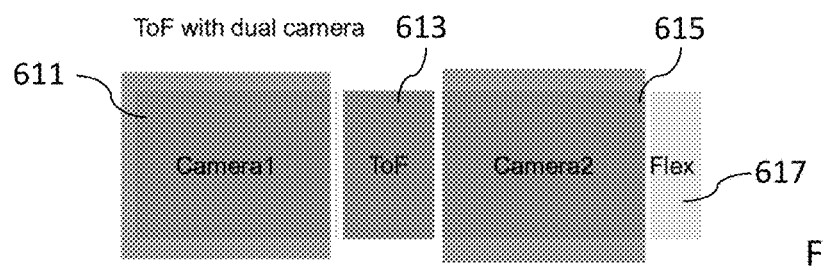
FIGS. 6A to 6I show further example apparatus comprising a distance determination module.
Figure 6B:
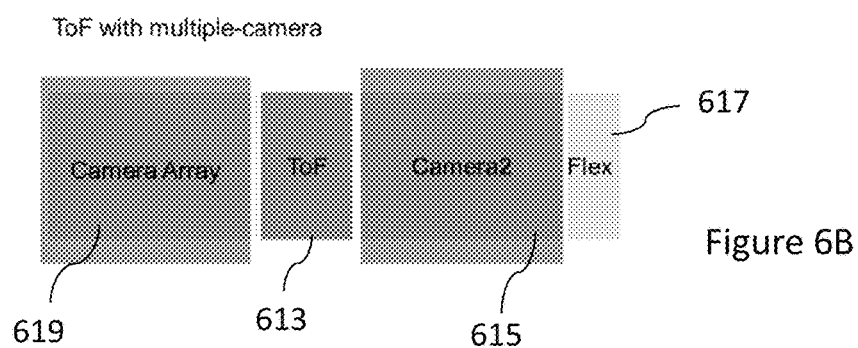

FIG. 6B, for example, shows an example device where the first camera 611 of the arrangement of FIG. 6A is replaced by a multi-aperture camera array 619.

Figure 6C:
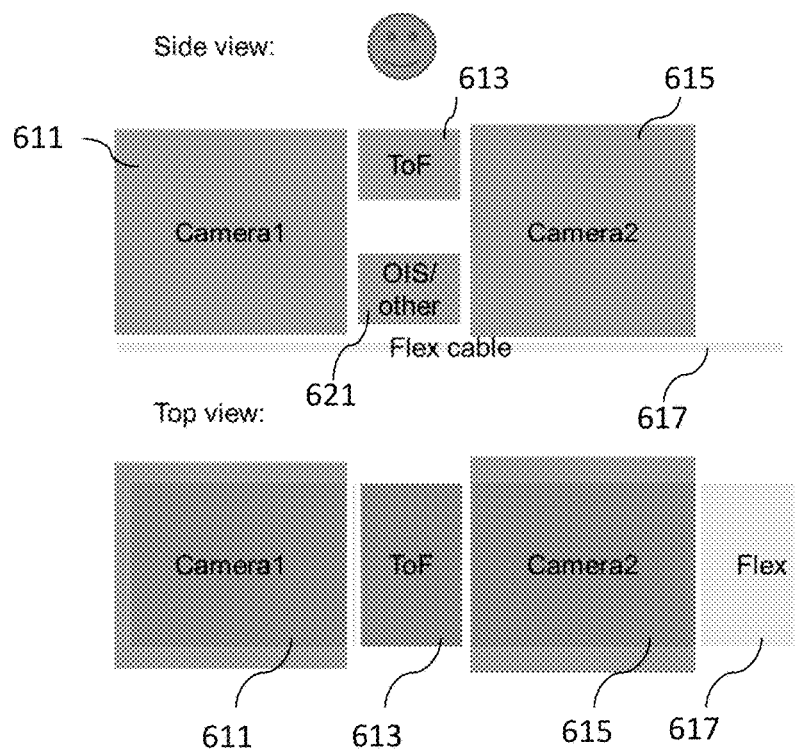

As discussed previously in order to create a suitable 3D/depth map, a gap or void is needed between the camera modules in the dual camera configuration. As the ToF module is much smaller than each of the camera modules in the dual-camera configuration, the ToF module can potentially reuse this void or gap or space between the cameras modules. Furthermore, in some embodiments the packaging volume optimization can be further improved by using the space 'below' the ToF module and between the multiple cameras. For example, as shown in FIG. 6C another component such as an OIS (Optical Image Stabilizer) module 621 may be placed beneath the ToF module 613 and between the first camera 611 and the second camera 615. In such a manner, the overall system space/volume taken by the ToF assisted 3D/depth camera implementation may be minimized. In addition, by putting the ToF module in between the camera modules the field of view (FoV) of the ToF module overlaps with a symmetrical and maximum extent with the FoV of each of the camera modules.

Figure 6D:
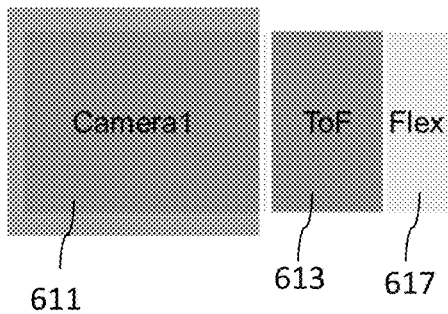
Figure 6E:
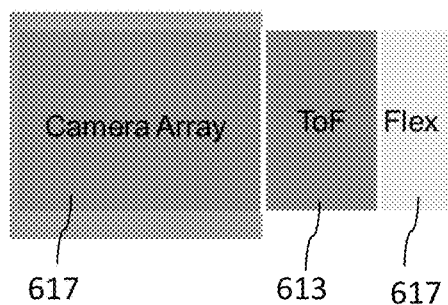

Although the examples described herein feature a multiple camera based ToF module assisted 3D/depth camera implementation in some embodiments the ToF module may replace one of the camera modules or camera array modules as well as assisting the 3D/depth map or model determination. For example, FIG. 6D shows an example wherein the second camera is removed/replace by a ToF module on the flexible connector 617. FIG. 6E furthermore shows an example wherein the first camera module 611 shown in FIG. 6D is replaced by a multiple aperture camera array 619. In such embodiments, the ToF module may be used together with a single camera or camera array for a compact and economic 3D/depth implementation. For instance, a ToF module and single camera solution can be used in a low cost or mid-end 3D/depth use case, where the design has a tight space and bill of materials (BoM) budget.

In some embodiments, the ToF module or sensor can be any suitable type of module or sensor. For example, in some embodiments the module or sensor may be a direct ToF sensor with histogram generation capacity. The histogram generation capacity uses the SPAD technology to collect returned photons from different objects. In such embodiments, different objects show different histogram peaks and thus can be used to generate or assist in the creation of simple low resolution 3D/depth maps or models. These low resolution maps or models can be used in simple use cases such as foreground/background or object/background separation. The histogram function and the low resolution map or model may also improve the 3D/depth camera array in cases such as low light condition.

An application of 3D/depth maps is in 3D sensing. The motion of a subject in the field of view can be also computed after the 3D map of the subject is created. The 3D sensing then may be used in object tracking and gesture control of apparatus. One of the challenges of the pure multi-camera embodiments is that of speed of calculation and the size of the module. For instance, typical 3D sensing structured light or TOF camera products such as Microsoft's Kinect and Intel's RealSense use IR illumination and IR sensors for gesture control. Although an IR solution can determine a 3D map in low light conditions, the IR solution requires additional power and cost especially when implemented within a mobile form factor. This is because a typical mobile device camera is a RGB camera with IR cut off filter. In some embodiments, gesture control and 3D sensing applications may be implemented using multiple ToF module assistance of multiple camera modules (or camera arrays). These embodiments have the following advantages.

Firstly, the ToF module is much smaller and cheaper than RGB camera and IR camera modules. Thus, multiple ToF modules are smaller than a single camera and using multiple ToF modules in a gesture controlled device is more space and cost effective than using additional cameras in a multiple camera implementation. For instance, a dual-ToF module plus dual-camera implementation can be used instead of quad-cameras solution.

Figure 6F:
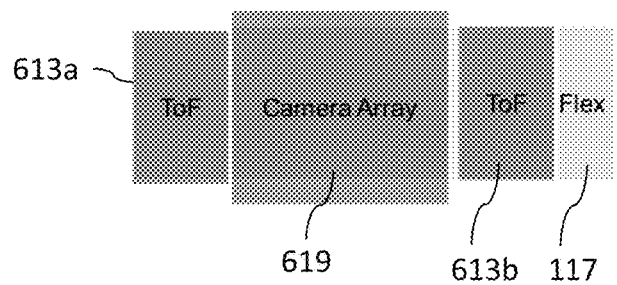

Thus, for example, as shown in FIG. 6F a multiple ToF module and single camera array device is shown. The device comprises a first ToF module 613a located one side of a camera array 619, and a second ToF module 613b located on the other side of the camera array 619. The first ToF module 613a, camera array 619, and second ToF module 613b connected to the flexible connector 617. FIG. 6H shows a modification to the device of FIG. 6F where the camera array 619 is replaced by a camera module 611.

Figure 6G:
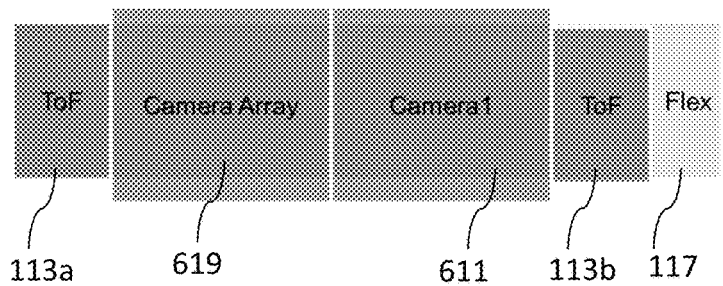
Figure 6H:
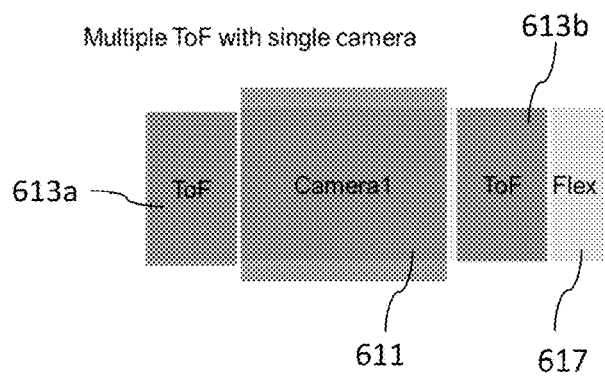
Figure 6I:
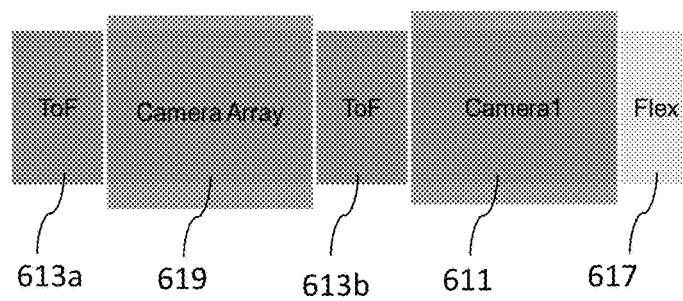

Furthermore with respect to FIG. 6G and 6I example multiple ToF module and multiple camera embodiments are shown. With respect to FIG. 6G, a camera array 619 and camera module 611 are located next to each other and separate the two ToF modules 113a and 113b. Each of the ToF modules may thus detect the distance and any change in distance caused by an object moving. FIG. 6I shows an example wherein the ToF modules 113a and 113b and the camera 611/camera array 619 modules are alternated in order that both the ToF modules are separated and both of the camera/camera array modules are separated.

In such embodiments initial or simple 3D sensing can be achieved by the use of the ToF modules. For example, object tracking or simple gesture detection such as hand movement can be achieved by the multiple ToF and at least one camera.

The ToF modules 113a and 113b can thus very quickly determine any objects within the field of view and furthermore their position and movement. The multiple-camera and the ISP can then do further computational analysis of the images for further 3D sensing and complicated gesture analysis (for example finger gesture analysis).

In some embodiments the 3D sensing generated by the multiple ToF module can be complementary with multiple camera 3D sensing. Therefore, a multi-ToF module and multiple cameras 3D/ranging map or model can have better and more accurate results than the multiple camera implementations.

Figure 7:
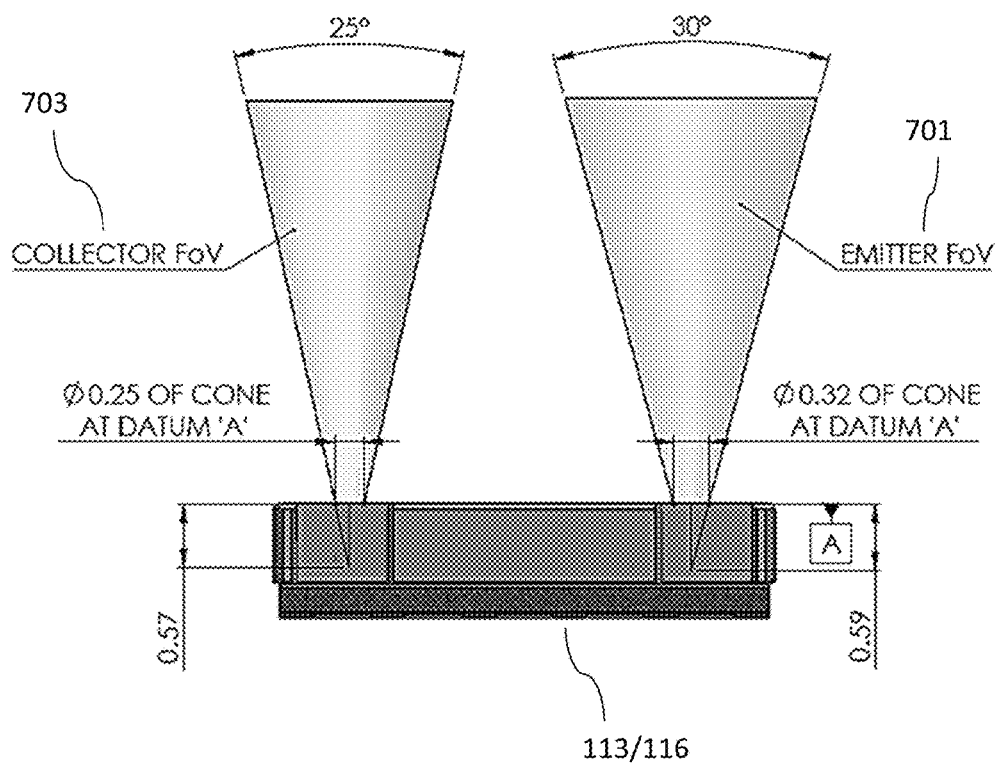
FIG. 7 shows example collector and emitter field of view cone dimensions for time of flight modules within apparatus as shown in FIGS. 1 and 6A to 6I.
Figure 8:
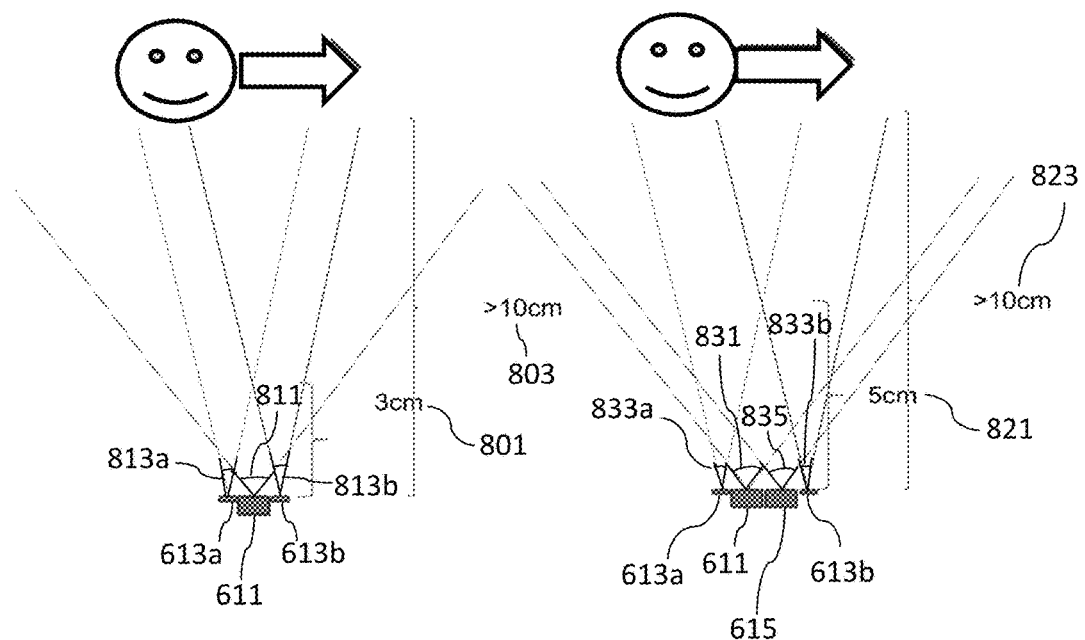
FIG. 8 shows example beam coverage using the apparatus shown in FIGS. 6F and 6G.

A multiple ToF implementation may have further advantages. As shown in FIG. 7, the ToF module 113 has an emitter field of view (FoV) 701 and a collector field of view (FoV) 703, the smallest of which defines a sensor FoV, which in the example shown in FIG. 7, is about 25 degrees. Increasing the FoV in a single ToF module requires a higher power (which is then limited by a class 1 safety limit) or shorter maximum effective range (because of the inverse square law). In the embodiments described herein by employing multiple ToF modules the FoV is increased without reducing the effective maximum ranging distance. This can, for example, be shown in FIG. 8 which shows a first single camera 611, dual ToF module 613a, 613b configuration (similar to FIGS. 6F and 6H) the where the camera FoV 811 and the ToF module FoVs 813a and 813b produce a combined FoV for the ToF modules greater than the ToF module FoV shown in FIG. 2. FIG. 8 furthermore shows a dual camera 611, 615 and dual ToF module 613a, 613b configuration (similar to FIG. 6G) where the camera FoVs 831 and 835 the ToF module FoVs 833a and 833b produce a combined FoV for the ToF modules greater than the ToF module FoV shown in FIG. 2.

In some embodiments the production alignment between the ToF module and the multiple cameras can be managed. For instance, by locating the ToF in the void between the camera modules the freedom for misalignment of the cameras is reduced as there is less 'space' in between the cameras and thus the chance for variation is reduced. In addition, in some embodiments the camera can be used during production to check the IR FoV of the ToF VCSEL in order to ensure a correct ToF alignment.

Figure 9:
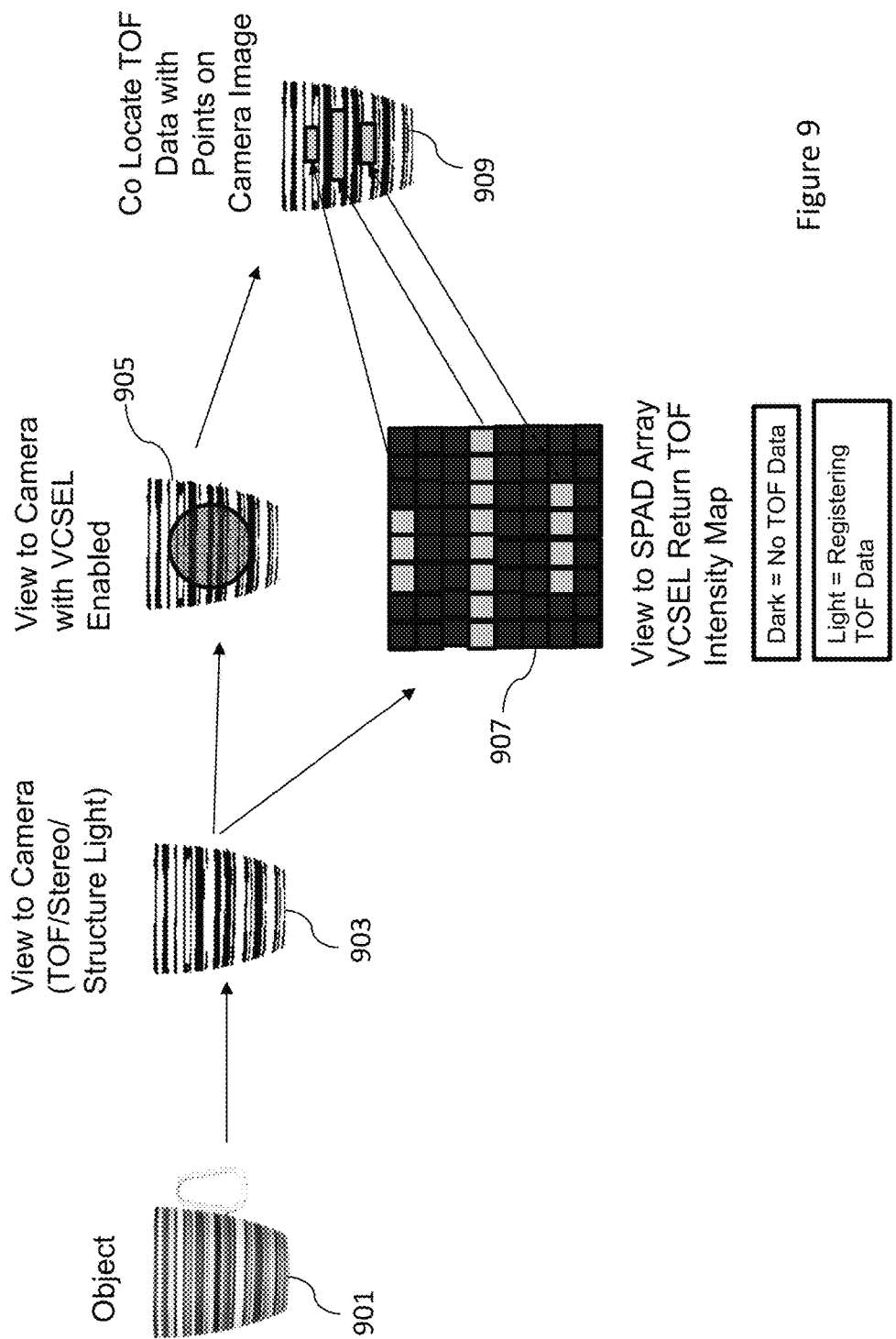
FIGS. 9 to 11 show example methods employing the apparatus according to some embodiments.
Figure 10:
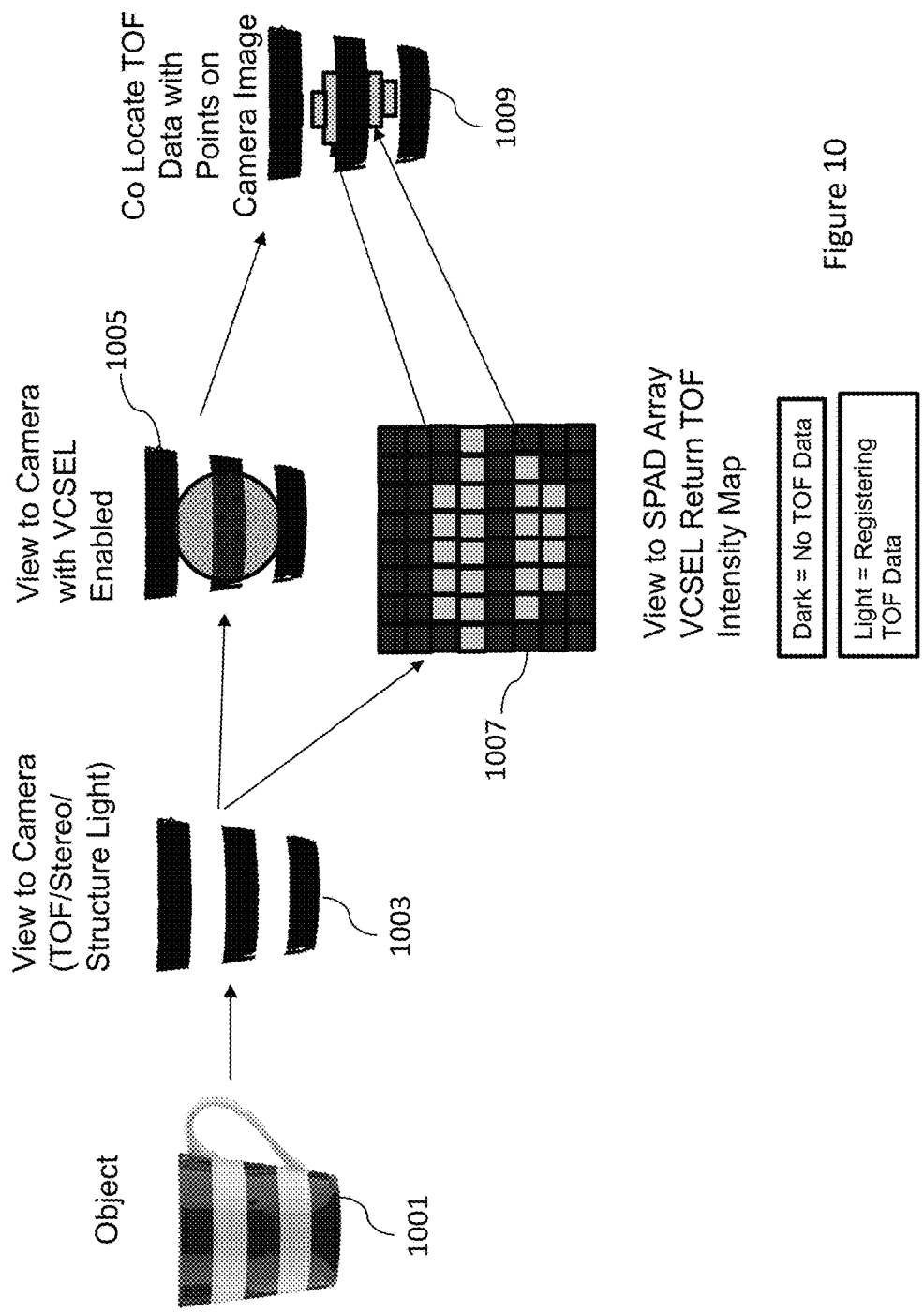
Figure 11:
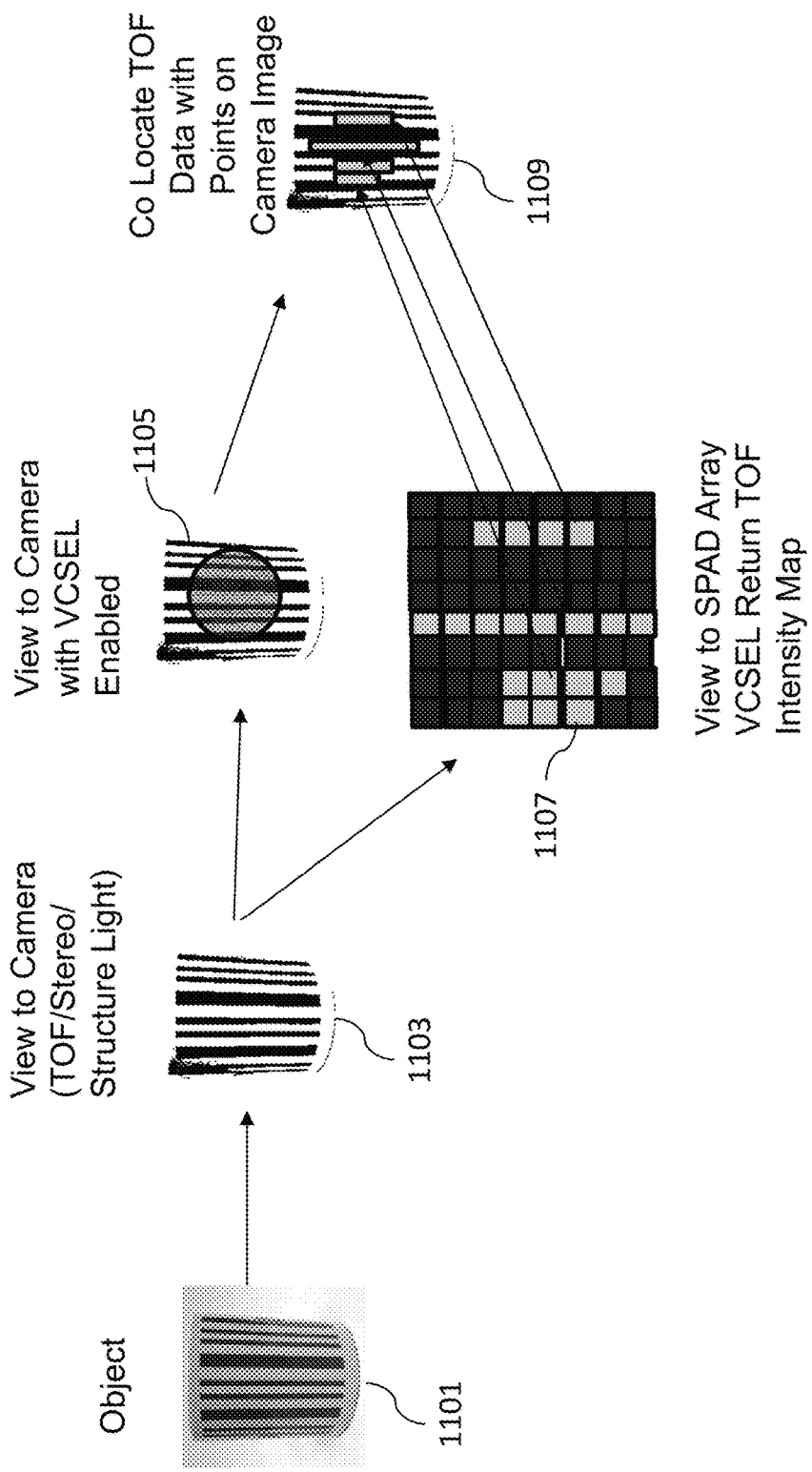

With respect to FIGS. 9 to 11, examples of combinations of the camera and ToF module data are shown. Thus, for example the FIGS. 9 to 11 show various 'difficult' example objects 901, 1001, 1101. The object camera view 903, 1003, 1103 produced by the camera is furthermore shown. The object camera view 905, 1005, 1105 with VCSEL illumination is furthermore shown. The areas which having been illuminated as able to produce distance estimates using the ToF SPAD based module are shown in the figures by the view 907, 1007, 1107 where the light color areas define areas where distances may be estimated with a high confidence. Having determined the ToF SPAD based distance estimates these can be combined with the points on the object camera image to generate images 909, 1009, 1109 of the object camera view and the ToF SPAD based distance views. In other words the FIGS. 9 to 11 show how the ToF SPAD based distance data may be combined with the camera images to generate more accurate distance determinations as the known ToF estimated distances may be used to set a datum point to calculate the 3D map.

It should be appreciated that the device may be any suitable device. By way of example only and without limitation, that device may be a mobile telephone, smart phone, tablet, computer, measuring device, switch controller such as for a light, controlling a water supply such as in a tap or toilet, door controller, distance sensor, impact controller, or any other suitable device.

Some embodiments may use other sensors, instead of SPADs. These sensors may be integrating photo-sensitive elements capable of receiving light intensity, time of arrival, frequency or phase or amplitude/intensity modulation, wavelength (color) or other information.

It should be appreciated that the above described arrangements may be implemented at least partially by an integrated circuit, a chip set, one or more dies packaged together or in different packages, discrete circuitry or any combination of these options.

Various embodiments with different variations have been described here above. It should be noted that those skilled in the art may combine various elements of these various embodiments and variations.

Such alterations, modifications, and improvements are intended to be part of this disclosure, and are intended to be within the scope of the present invention. Accordingly, the foregoing description is by way of example only and is not intended to be limiting. The present invention is limited only as defined in the following claims and the equivalents thereto.

The invention claimed is:

1. An apparatus, comprising:
a camera module configured to generate a first image and a second image taken from offset positions with partially overlapping fields of view;
at least one time of flight (ToF) single photon avalanche diode (SPAD) based range detecting module configured to generate at least one distance determination between the apparatus and an object within the partially overlapping fields of view; and
a processor configured to receive the first and second images from the camera module and the at least one distance determination from the ToF SPAD based range detecting module and determine a depth map based on depth information obtained from processing the first and second images from the camera module and the at least one distance determination;
wherein the processor is further configured, in response to an ambient light condition, to:
determine the depth map substantially based on the at least one distance determination from the ToF SPAD based range detecting module if the ambient light condition indicates a relatively low ambient light;
determine the depth map substantially based on the first and second images from the camera module if the ambient light condition indicates a relatively high ambient light; and
determine the depth map based on a combination of the at least one distance determination and the first and second images if the ambient light condition indicates neither relatively low nor relatively high ambient light.

2. An apparatus, comprising:
a camera module configured to generate a first image and a second image taken from offset positions with partially overlapping fields of view;
at least one time of flight (ToF) single photon avalanche diode (SPAD) based range detecting module configured to generate at least one distance determination between the apparatus and an object within the partially overlapping fields of view; and
a processor configured to receive the first and second images from the camera module and the at least one distance determination from the ToF SPAD based range detecting module and determine a depth map based on depth information obtained from processing the first and second images from the camera module and the at least one distance determination;
wherein the processor is further configured to:
determine the depth map substantially based on the at least one distance determination from the ToF SPAD based range detecting module if speed of movement of the object is relatively fast;
determine the depth map substantially based on the at least one image from the at least one camera module if speed of movement of the object is relatively slow; and
determine the depth map based on a combination of the at least one distance determination and the at least one image if speed of movement of the object is neither fast nor slow or is both fast and slow.

3. An apparatus, comprising:
a camera module configured to generate a first image and a second image taken from offset positions with partially overlapping fields of view;
at least one time of flight (ToF) single photon avalanche diode (SPAD) based range detecting module configured to generate at least one distance determination between the apparatus and an object within the partially overlapping fields of view; and
a processor configured to receive the first and second images from the camera module and the at least one distance determination from the ToF SPAD based range detecting module and determine a depth map based on depth information obtained from processing the first and second images from the camera module and the at least one distance determination;
wherein the processor is further configured to:
determine the depth map substantially based on the at least one distance determination from the ToF SPAD based range detecting module if a desired accuracy of object detection is a relatively high accuracy;

determine the depth map substantially based on the at least one image from the at least one camera module if the desired accuracy of object detection is a relatively low accuracy; and determine the depth map based on a combination of the at least one distance determination and the at least one image if the desired accuracy of object detection is neither low nor high accuracy.

4. An apparatus, comprising:

a camera module configured to generate a first image and a second image taken from offset positions with partially overlapping fields of view;

at least one time of flight (ToF) single photon avalanche diode (SPAD) based range detecting module configured to generate at least one distance determination between the apparatus and an object within the partially overlapping fields of view; and a processor configured to receive the first and second images from the camera module and the at least one distance determination from the ToF SPAD based range detecting module and determine a depth map based on depth information obtained from processing the first and second images from the camera module and the at least one distance determination;

wherein the processor is further configured to:

determine the depth map substantially based on the at least one distance determination from the ToF SPAD based range detecting module when a range to the object is a macro or near distance;

determine the depth map substantially based on the at least one image from the at least one camera module when the range to the object is a far distance; and determine the depth map based on a combination of the at least one distance determination and the at least one image when the range to the object is neither near or far distance.

5. An apparatus, comprising:

a camera module configured to generate a first image and a second image taken from offset positions with partially overlapping fields of view;

at least one time of flight (ToF) single photon avalanche diode (SPAD) based range detecting module configured to generate at least one distance determination between the apparatus and an object within the partially overlapping fields of view; and a processor configured to receive the first and second images from the camera module and the at least one distance determination from the ToF SPAD based range detecting module and determine a depth map based on depth information obtained from processing the first and second images from the camera module and the at least one distance determination;

wherein the processor is further configured to:

determine the depth map substantially based on the at least one distance determination from the ToF SPAD based range detecting module when the apparatus is operating in a low power consumption mode;

determine the depth map substantially based on the at least one image from the at least one camera module when the apparatus is operating in a high power consumption mode; and determine the depth map based on a combination of the at least one distance determination and the at least one image when the apparatus is operating in neither low nor high power consumption modes.

6. The apparatus as claimed in claim 5, wherein the camera module comprises two cameras separated by a determined distance, wherein the at least one ToF SPAD based range detecting module is configured to be located within a volume defined by the determined distance.

7. The apparatus as claimed in claim 5, wherein the camera module comprises a multi-aperture camera.

8. The apparatus as claimed in claim 5, wherein the processor is configured to:

determine at least one point on the depth map which is spatially co-incident with the at least one distance determination from the ToF SPAD based range detecting module; and calibrate the depth map at the at least one point based on the spatially co-incident distance determination.

9. The apparatus as claimed in claim 1, wherein the camera module comprises two cameras separated by a determined distance, wherein the at least one ToF SPAD based range detecting module is configured to be located within a volume defined by the determined distance.

10. The apparatus as claimed in claim 1, wherein the camera module comprises a multi-aperture camera.

11. The apparatus as claimed in claim 1, wherein the processor is configured to:

determine at least one point on the depth map which is spatially co-incident with the at least one distance determination from the ToF SPAD based range detecting module; and calibrate the depth map at the at least one point based on the spatially co-incident distance determination.

12. The apparatus as claimed in claim 2, wherein the camera module comprises two cameras separated by a determined distance, wherein the at least one ToF SPAD based range detecting module is configured to be located within a volume defined by the determined distance.

13. The apparatus as claimed in claim 2, wherein the camera module comprises a multi-aperture camera.

14. The apparatus as claimed in claim 2, wherein the processor is configured to;

determine at least one point on the depth map which is spatially co-incident with the at least one distance determination from the ToF SPAD based range detecting module; and calibrate the depth map at the at least one point based on the spatially co-incident distance determination.

15. The apparatus as claimed in claim 3, wherein the camera module comprises two cameras separated by a determined distance, wherein the at least one ToF SPAD based range detecting module is configured to be located within a volume defined by the determined distance.

16. The apparatus as claimed in claim 3, wherein the camera module comprises a multi-aperture camera.

17. The apparatus as claimed in claim 3, Wherein the processor is configured to:

determine at least one point on the depth map which is spatially co-incident with the at least one distance determination from the ToF SPAD based range detecting module; and calibrate the depth map at the at least one point based on the spatially co-incident distance determination.

18. The apparatus as claimed in claim 4, wherein the camera module comprises two cameras separated by a determined distance, wherein the at least one ToF SPAD based range detecting module is configured to be located within a volume defined by the determined distance.

19. The apparatus as claimed in claim 4, wherein the camera module comprises a multi-aperture camera.

20. The apparatus as claimed in claim 4, wherein the processor is configured to:

determine at least one point on the depth map which is spatially co-incident with the at least one distance determination from the ToF SPAD based range detecting module; and calibrate the depth map at the at least one point based on the spatially co-incident distance determination.

* * * * *